United States Patent
Chakraborty et al.

(10) Patent No.: US 9,158,510 B2
(45) Date of Patent: Oct. 13, 2015

(54) SYSTEM AND COMPUTER PROGRAM PRODUCT FOR CREATING A TELECOMMUNICATIONS APPLICATION

(75) Inventors: Dipanjan Chakraborty, Kolkata (IN); Sunil Goyal, Haryana (IN); Sumit Mittal, Uttar Pradesh (IN); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1936 days.

(21) Appl. No.: 11/943,672

(22) Filed: Nov. 21, 2007

(65) Prior Publication Data

US 2009/0129575 A1    May 21, 2009

(51) Int. Cl.
*G06F 9/44* (2006.01)
*H04W 4/00* (2009.01)

(52) U.S. Cl.
CPC .. *G06F 8/36* (2013.01); *G06F 8/10* (2013.01); *H04W 4/00* (2013.01)

(58) Field of Classification Search
USPC .................................................. 717/120, 104
See application file for complete search history.

(56) References Cited

U.S. PATENT DOCUMENTS

| | | | |
|---|---|---|---|
| 5,991,535 A | 11/1999 | Fowlow et al. | |
| 6,637,021 B1 * | 10/2003 | Dubey | 717/108 |
| 7,546,576 B2 * | 6/2009 | Egli | 717/106 |
| 7,770,146 B2 * | 8/2010 | Brunswig et al. | 717/104 |
| 7,844,897 B1 * | 11/2010 | Cooley et al. | 715/243 |
| 2005/0008003 A1 * | 1/2005 | Ramey et al. | 370/352 |
| 2005/0114832 A1 * | 5/2005 | Manu | 717/106 |
| 2006/0026261 A1 * | 2/2006 | Allday et al. | 709/217 |
| 2007/0036315 A1 | 2/2007 | Malinowski et al. | |
| 2007/0081523 A1 | 4/2007 | Mishra | |
| 2007/0150480 A1 | 6/2007 | Hwang et al. | |
| 2007/0233681 A1 * | 10/2007 | Ronen et al. | 707/8 |

OTHER PUBLICATIONS

Aggarwal et al., "Constraint driven Web service composition in METEOR-S," published in Services Computing, 2004. Proceedings.
Constantopoulos et al., "The Software Information Base: A Server for Reuse," published in VLDB Journal, 4, 1-43 (1995).
Niels Joncheere, "The Service creation environment: A telecom case study," vol. 217 (2007).
Majithia et al., "Triana: a graphical Web service composition and execution toolkit," published in Web Services, 2004 Proceedings.
Ganesarajah et al.,"Workflow-based composition of Web-services: a business model or a programming paradigm?" Enterprise Distributed Object Computing Conference, 2002.
Pautasso et al., "Visual composition of Web services," Human Centric Computing Languages and Environments, 2003 Proceedings.

(Continued)

*Primary Examiner* — Hang Pan
(74) *Attorney, Agent, or Firm* — Ryan, Mason & Lewis, LLP

(57) ABSTRACT

Techniques for using a proxy model to encapsulate one or more telecommunications (telecom) functionalities are provided. The techniques include generating a proxy model, wherein the proxy model comprises at least one of a representation module, an implementation module, a metadata module, one or more utility snippet modules, one or more unit test code modules and a module linking to one or more blogs, and using the proxy model to encapsulate one or more telecom functionalities. Techniques are also provided for creating a telecom service using the proxy model.

11 Claims, 11 Drawing Sheets

(56) References Cited

OTHER PUBLICATIONS

Foster et al , "Leveraging Eclipse for integrated model-based engineering of web service compositions," Proceedings of the 2005 OOPSLA workshop on Eclipse technology exchange.

Alcatel Open Service Delivery Solution, http://www eurescom.de/Parlay-OSA-products/Alcatel/Alcatel open service delivery solution pdf downloaded on Jan. 9, 2008.

BEA AquaLogic Family of Tools http://www bea com/framework jsp?CNT=index htm&FP=/content/products/aqualogic/ downloaded on Jan. 9, 2008.

IBM QEDWiki, http://services.alphaworks.ibm.com/qedwiki/, downloaded on Jan. 9, 2008.

IP Multimedia Subsystem (IMS) Architecture, http://www dataconnection com/sbc/imsarch.htm, downloaded on Jan. 9, 2008.

JackBe PrestoStudio, http://www.jackbe.com/Papers/JackBeStudioOverview pdf, downloaded on Jan. 9, 2008.

JSR 289, http://jcp.org/en/jsr/detail?id=289, downloaded on Jan. 9, 2008.

Microsoft Connected Services Framework Sandbox http://www microsoft com/serviceproviders/solutions/connectedservicesframework mspx downloaded on Jan. 9, 2008.

Open Service Access (OSA), Parlay X Web Services, Part 1: Common 3GPP TS 29 199-01 http://www 3gpp.org/ftp/Specs/html-info/29199-01 htm, downloaded on Jan. 9, 2008.

Parlay API Specification, http://www parlay.org, downloaded on Jan. 9, 2008.

Telco Web 2 0 Mashups: A New Blueprint for Service Creation, http://www.networkmashups.com/docs/ssi 0507 pdf, downloaded on May 31, 2007.

Web 21c sdk, http://web21c.bt.com/, downloaded on Jan. 9, 2008.

Yahoo Pipes, http://pipes.yahoo.com/pipes/, downloaded on Jan. 9, 2008.

Adomavicius et al , "Incorporating Contextual Information in Recommender Systems using a Multidimensional Approach" Proc of ACM Trans on Inf Sys , vol. 23, p. 103-45, 2005.

Agarwal et al , "A Service Creation Environment based on End to End Composition of Web Services," In Proceedings of the 14th International World Wide Conference, May 2005.

Aschenbrenner et al , "Blog Mining in a Corporate Environment," http://ieg ifs tuwien ac at/techreports/Asgaard-TR-2005-11 pdf downloaded on Jan. 9, 2008.

Cardoso et al., "Quality of Service for Workows and Web Service Processes," Journal of Web Semantics, 1:281-308, 2004.

Chakraborty et al , "BusinessFinder: Harnessing Presence to enable Live Yellow Pages for Small, Medium and Micro Mobile Businesses," Proceedings of IEEE Comm Mag , Jan. 2007.

Chakraborty et al., "On the Changing Face of Service Composition in Telecom," In proceedings of MNCNA Workshop, Middleware Conference, Nov. 2007.

Rosenberg, et al , "SIP: Session Initiation Protocol," http://www.rfc-editor org/rfc/rfc3261 txt, 2002.

Staab et al., "Web services: Been there, done that?" IEEE Intelligent Systems, pp. 72-85, Jan.-Feb. 2003.

Sivashanmugam et al , "Framework for Semantic Web Process Composition," In Special issue of the International Journal of Electronic Commerce (IJEC), 2004.

Zeng et al., "Quality Driven Web Services Composition," In Proceedings of the 12th Intl World Wide Web Conf., May 2003.

Schulke et al., "Creating New Communication Services Efficiently," NEC J. of Adv. Tech., pp. 170-178, Spring 2005.

Craig Stender, "Executive Summary: Telecommunications Open Partnerships for Arizona (TOPAZ)," NASCIO's 2002 Recognition Awards Communications Infrastructure.

Banerjee et al , "Providing Middleware Support for the Control and Co-ordination of Telecom Mashups," In proceedings of MNCNA Workshop Middleware Conference Nov. 2007.

Majitha et al., A Framework for Automated Service Composition in Service-Oriented Architectures, Feb. 7, 2008, pp. 1-15.

\* cited by examiner

FIG. 5

502
- XML proxy representation
    Proxy Id
    List of Methods
        - LocationInfo getLocation (String address, Accuracy requestedAccuracy, Accuracy acceptableAccuracy) throws UnknownsubscriberException, SubscriberUnreachableException
        - Distance getDistance (String address, String longitude, String latitude) throws UnknownSubscriberException, NumberFormatException
        - LocationInfo[ ] getLocationForGroup (String address, Accuracy requestedAccuracy, Accuracy acceptableAccuracy) throws UnknownSubscriberException, SubscriberUnreachableException

- Implementation jar
    Code implementing api's

- Metadata
    Keywords - Location, Distance

- Utility Snippets
    Parsing LocationInfo

- Unit Tests
    TestForGetLocation.java
    TestForGetDistance.java
    TestForGetLocationForGroup.java

- LinkToBlogs

FIG. 10
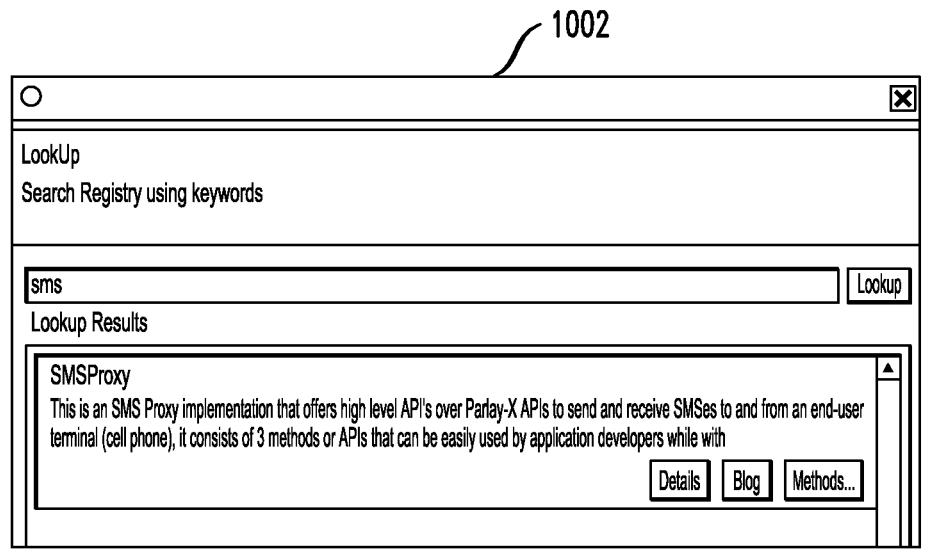
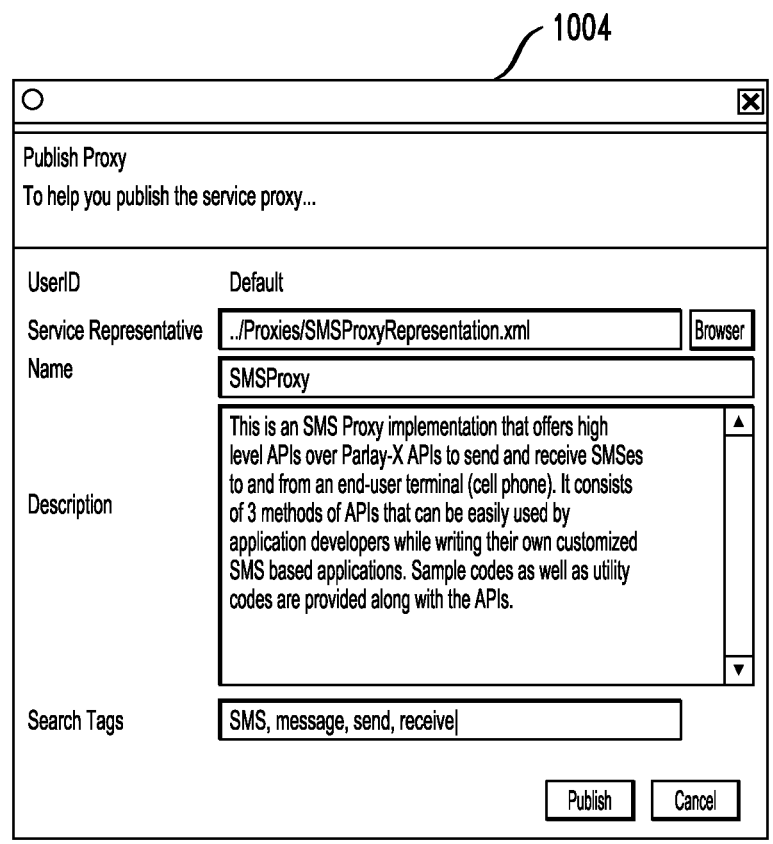

*FIG. 11*

```
<html>
<head>
.....
<script type="text.javascript" language="Javascript1.2"
src="scripts/locationProxy.js"></script>
.....
<script type="text/javascript">
var latitude;
var longitude;
function callback(){
    if(req.readyState==4) (
        if )req.status == 200)(
                    latitude=req.responseXML.getElementById('lat');
                    longitude=req.responseXML.getElementById('long');
            )
        )
    )
)
</script>
</head>
<body>
.....
<!-- Application specific HTML and Javascript Logic -->
<!-- Take CellNumber as Input -->
<!-- javascript locationProxy returns latitude and longitude respectively -->
<script type="text/javascript">
getLocation(CellNumber);
</script>
<script type="text/javascript">
if (GBrowserIsCompatible()) (
        var icon = new GIcon(baseIcon);
        icon.image = "http://www.google.com/mapfiles/marker.png";
        var point = new GLatLng(latitude, longitude);
        map = new GMap2(document.getElementById(" "));
        map.setCenter(point, 13);
        map.addOverlay(new GMarker(point, icon));
        )
</script>
.....
</body>
</html>
~
```

SYSTEM AND COMPUTER PROGRAM PRODUCT FOR CREATING A TELECOMMUNICATIONS APPLICATION

CROSS-REFERENCE TO RELATED APPLICATION(S)

The present application is related to a commonly assigned U.S. application entitled "Method for Creating a Telecommunications Application," identified by Ser. No. 11/943,677, and filed on even date herewith, the disclosure of which is incorporated by reference herein in its entirety.

FIELD OF THE INVENTION

The present invention generally relates to telecommunication technology, and, more particularly, to telecommunication applications.

BACKGROUND OF THE INVENTION

The ability to bring new value-added services to the marketplace quickly and by differentiation (that is, with increased quality and lower manageability) is advantageous for telecommunications (herein after "telecom") service providers because of, for example, decreasing revenue from voice calls. Telecom operators are aggressively looking at newer sources of revenue such as, for example, partnerships with third-party providers to offer alternate services such as gaming applications, news, ring-tones, etc. In recent years, however, such services are facing strong competition from similar technologies and applications provided by internet content providers. Applications can be accessed through a browser-enabled phone, while paying only for the connectivity charges, and thereby adversely affect revenues from the paid-for services hosted on the telecom operator portal. Examples of such services include voice over internet protocol (VoIP), telephony conferencing services and various content services (for example, maps, ring-tones, etc.).

Telecom operators, however, have an advantage over internet service providers in terms of their still unmatched core functionalities of location, presence, call control, etc., characterized further by carrier-grade quality-of-service (QoS) and high availability.

As such, a potential channel exists for telecom operators to increase revenue by offering these functionalities as services to developers for creating new applications. However, telecom service composition is a challenging problem.

Many of the building blocks of a telecom infrastructure (for example, location registries (home location registers/visitor location registers (HLR/VLR)), accounting and billing services, etc.) are already in place to support basic operations such as voice and short-message service (SMS). However, these elements are not easily utilizable in new applications because they are not exposed using standardized frameworks and component models. Towards this, telecom operators in existing approaches are adopting service-oriented architecture (SOA) that would let developers access these services without knowledge of the underlying platform implementation.

Web services, as an instantiation of SOA, have received much interest due to their potential in facilitating seamless business-to-business or enterprise application integration. For example, the Parlay consortium defined a standard, called Parlay-X, which exposes web service interface for core telecom functionalities. In another example, IP Multimedia Subsystem (IMS) provides a reference framework to expose these functionalities as services to web-engineered systems using session initiation protocol (SIP).

Although efforts like Parlay-X and IMS are a step in the right direction, rapid development of applications that utilize telecom functionality still faces a number of challenges in a realistic setting. For example, one needs to provide interfaces that shield the application developer from different telecom protocols (for example, Parlay-X, SIP, etc.), including the legacy ones. Also, one needs to package the telecom functionalities so that they can be readily used in different programming styles (for example, Java, HTML/JavaScript, etc.) other than pure web service based composition (for example, Business Process Execution Language (BPEL)). Additionally, one needs to encapsulate the invocation of telecom functionality with various coordination rules Existing approaches include the creation of web processes using web service technology. Web service technology allows a developer to create an abstract process, based on enterprise and process constraints, and then to generate an executable process. Such an approach attempts to reduce the service composition problem to a constraint satisfaction problem.

Existing approaches also include automating the discovery and selection of a service, ensuring semantic and data-type compatibility, and presenting a framework to facilitate automated service composition using semantic web technologies. Additionally, existing approaches include graphical composition environments that allow the reuse of existing components to build an application.

Another existing approach includes an experimental software repository system that provides organization, storage, management, and access facilities for reusable software components. Such an approach, intended as part of an application development environment, is aimed at developing an integrated reuse-centered application development and support environment based on object-oriented techniques.

Also, existing approaches include defining a visual composition tool for constructing application programs using pre-existing software components. Another existing approach includes a service creation environment for composing web services by providing a higher level of abstraction and guiding developers in creating valid compositions. Such an approach also attempts to use the concept of aspect-oriented programming for cross-cutting concerns.

Existing approaches also include a graphical web service composition tool that allows users to construct complex workflows using pre-existing services transparently, and thereby insulating them from the complexity of interacting with numerous heterogeneous services. Such an approach also includes graphical web service discovery, composition and invocation framework. Users can graphically create complex service compositions and share the composite service as a business process execution language for web services (BPELWS) graph, or expose it as a service in a one-click manner. Also, users can catty out a "what-if" analysis by altering existing workflows, and users can record provenance data for a workflow and execute the composed graph on a grid or a peer-to-peer (P2P) network Many of the existing approaches allow the reuse of existing services and other software components to create an application. Other existing approaches focus on automatic selection of services and automatic generation of composition based on semantic web technologies. In practice, however, the end-user needs a composition environment that helps him or her identify the required service in given context (perhaps, for example, semi-automatically), and rarely needs the automatic service composition features.

Within existing approaches, additional challenges exist in the creation of telecom services. For example, there is the challenge of protocol heterogeneity, wherein there exists multiple, heterogeneous telecom protocols (for example, parlay-X (location), session initiation protocol (SIP) (presence), short message peer-to-peer protocol (SMPP) (short-message service (SMS)) to be supported in a telecom application. Also, there can be a need to hide protocols from service developers.

Additionally, there can be a need to provide interoperability among different protocols (for example, SMS connects to presence). Also, there exist challenges when a service can be accessed in multiple ways (for example, via the web, multiple mobile devices, etc.). Further, challenges may arise when no unified ecosystem exists for multiple players involved in the creation of telecom workflows. These players can include, for example, cellular providers offering SMS, location, availability, etc., third-party providers offering video, music, maps, and service developers using existing services to compose new ones.

Also, challenges exist in the need for a unified view cutting across different players, such as, for example, a view offering simple, effective mechanisms for "advertise," "lookup," "select," and "bind" of different telecom functionalities, to be utilized effectively in creating a telecom application. Additionally, there can be a need for a unified view cutting across different categories of programmers such as, for example, Java, JavaScript, representational state transfer (REST), business process execution language (BPEL), and asynchronous JavaScript and XML (AJAX).

As such, developers may not be aware of telecom protocols (for example, Parlay-X, SIP, Corba), and there may be a need to enable services for multiple devices, platforms and access modalities. Rapid service composition environments are advantageous for service providers to reduce the time-to-market of new services and address increasing competition.

SUMMARY OF THE INVENTION

Principles of the present invention provide techniques for creating a telecommunications application.

An exemplary method (which may be computer-implemented) for using a proxy model to encapsulate one or more telecommunications (telecom) functionalities, according to one aspect of the invention, can include steps of generating a proxy model, wherein the proxy model comprises at least one of a representation module, an implementation module, a metadata module, one or more utility snippet modules, one or more unit test code modules and a module linking to one or more blogs, and using the proxy model to encapsulate one or more telecom functionalities.

In an embodiment of the invention, an exemplary method for creating a telecom service includes the following steps: a service creation architecture is generated, wherein the service creation architecture comprises one or more composition studios and at least one of a repository of one or more telecom proxies, a metadata manager, a blog manager; an analytics manager and a publishing manager and used to create a telecom service, wherein creating the telecom service comprises at least one of designing the service, looking-up a proxy, selecting a proxy, configuring a proxy, generating code and obtaining input from a developer.

At least one embodiment of the invention can be implemented in the form of a computer product including a computer usable medium with computer usable program code for performing the method steps indicated. Furthermore, at least one embodiment of the invention can be implemented in the form of a system, preferably a data processing system, including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a diagram illustrating an exemplary proxy for the location functionality, according to an embodiment of the present invention;

FIG. 10 is a diagram illustrating proxy took-up and publishing interfaces, according to an embodiment of the present invention;

FIG. 11 is a diagram illustrating mash-up code fragment, according to an embodiment of the present invention;

DETAILED DESCRIPTION OF PREFERRED EMBODIMENTS

Figure 1:
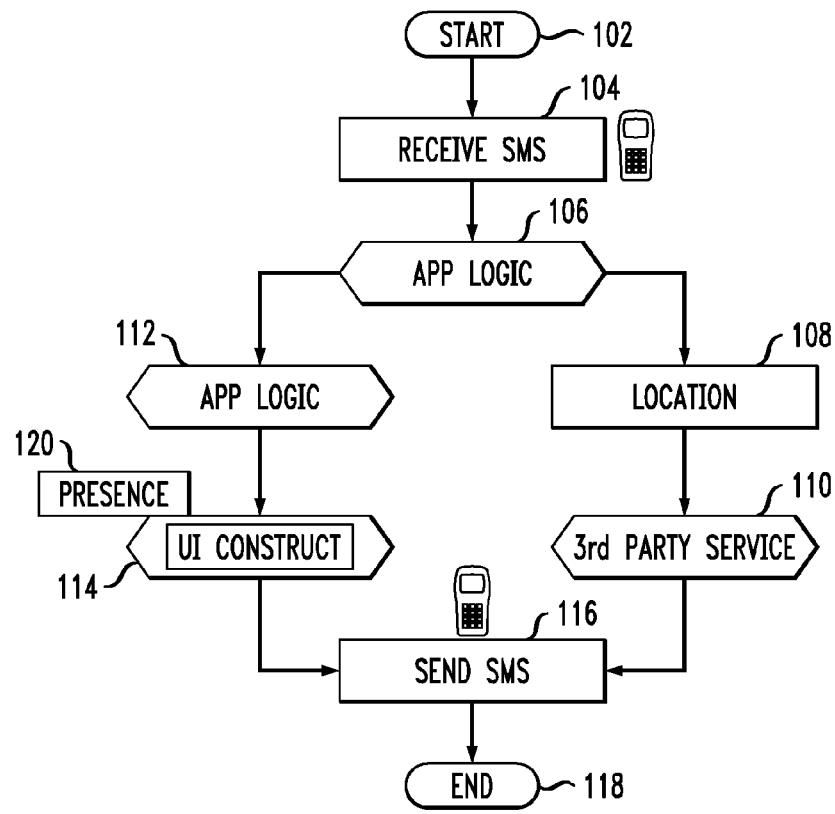
FIG. 1 is a diagram illustrating an exemplary telecom application template, according to an embodiment of the present invention.

Principles of the present invention include providing a service reference, encapsulation and enrichment (T-Rec) proxy model for encapsulating invocation, coordination and enrichment of telecom functionalities, tendering a service creation environment on top of the model, and facilitating usage by various different categories of developers. In one or more embodiments of the present invention, the charging functionality of the telecom operator (on top of the defined Parlay-X interfaces) is exposed using the telecom T-Rec proxy, and made available through the repository.

The proxy model provides interfaces shielding the application developer from the underlying telecom protocols. Such a model also allows seamless switching between different protocols (for example, when moving from legacy interfaces to Parlay-X interfaces). Also, the model for core telecom functionalities can be sufficiently broad so as to cover a range of programming styles, for example, Java, JavaScript, REST, BPEL and AJAX.

The proxy model can be used to hide invocation complexity for telecom protocols such as, for example, Parlay-X, SIP, etc. Also, the proxy model can be used to encapsulate a telecom functionality as well as to coordinate usage of telecom functionalities. The proxy model can also be used for a core telecom network (such as, for example, SMS, call control, etc) and/or infrastructure capability. Additionally, the proxy model can be generated in one or more programming styles. Programming styles may include, for example languages such as Java, JavaScript, BPEL, etc. and forms in which the proxy is made available (for example, visual (using, for example, widgets) and non-visual (using, for example, a chunk of textual code)).

A proxy can include, for example, service representation (for example, an extensible markup language (XML) metadata interchange (XMI) document), web services description language (WSDL) for web services, service implementation (for example, jar format for Java), data type definitions, exception classes, default handlers and utility snippets (which may include parsing, polling, and sample code, as well as instantiation objects specific to services (for example, SIP classes for Presence). A proxy can also include keywords (used during look-up) and associated documentation.

Proxy representation includes signatures of the methods (APIs) exposed by the proxy along with a textual description of the service it represents. The APIs are designed to hide protocol-specific details and abstract the telecom functionality to the programming language level. Also, APIs corresponding to multiple styles (for example, Java, BPEL, JavaScript) should be created to support different environments.

Additionally, such a model can pre-generate the clients corresponding to different programming styles, and package them in a structured manner. Having a well-defined structured format enables any application development environment to integrate these clients seamlessly. Also, when a telecom functionality gets used in an application, it is advantageous for a telecom operator as well as an application developer to be able to coordinate its usage. For instance, mechanisms may be required for embedding logic for charging, specifying access control policies, etc. Furthermore, as described herein, application developers can contribute, implicitly or explicitly, to the enrichment and refinement of the exposed telecom functionality (and its usage). As such, in one or more embodiments of the present invention, a model is used that is sufficiently rich to enable the functionalities detailed above.

One or more embodiments of the invention include architectural components of a third-party services registry to advertise and locate value added services (for example, gaming, music, etc.), a telecom palette to provide a gateway into telecom offerings (for example, location, presence, etc.) while hiding protocol heterogeneity, and a composition studio to help developers visually compose and expose telecom services.

To enable effective community involvement, principles of the present invention include mechanisms for wiki and/or blogs for services, publishing of reusable code fragments for different categories of programmers, refinement of service descriptions, etc. Interacting with a community-driven service (application) registry, developers can combine services, connector codes and application logic to create an almost-deployable telecom service (also referred to herein as an intermediate service or application) that can be customized for various devices and access modalities.

In one or more embodiments of the present invention, a Web 2.0 telecom service composition framework includes a telecom repository, facilitates rapid service composition and is based on principles of Web 2.0. A telecom repository may include, for example, a telecom palette (a gateway for telecom services such as SMS, Presence, and Voice over Internet Protocol (VoIP)), third party services (music, gaming and Google maps, etc.), a parameterized telecom snippet library of connecting codes and application logic, and community-driven lookup, publish and blogging capabilities.

Facilitating rapid service composition may include, for example, organizing and generating code from the repository to an almost deployable (intermediate) service, and customizing services for different devices, platforms and access modalities.

Additionally, one or more embodiments of the invention incorporate a model of "reuse," "refinement" and "enrichment" for telecom operations (for example, core telecom functionality, third party services, and snippets library), as well as connect multiple categories of integrated development environments (IDEs) to a proxy repository. As such, this includes the capability of integrating with various development environments (for example, heavy-weight application development environment to web-driven mash-up environments), and a symbiotic relationship across different categories of application developers As described herein, one or more embodiments of the present invention include the ability to integrate telecom elements with business logic or non-telecom elements. This integration ability facilitates the transformation of high level service specifications into concrete code, as well as the automatic incorporation of selected proxies in the application and the generation of skeleton application code. One or more embodiments of the invention can also organize telecom-specific constructs, telecom-specific exceptions and default handlers, as well organize utilities (for example, message parsing, and instantiation classes).

As detailed herein, service composition can include multiple elements. For example, one such element may include a service specification, wherein a developer specifies one or more steps in a composite scenario. Another element may include a service proxy look-up, wherein for each step, a set of matching proxies is returned. Such a look-up can be based, for example, on keywords, or input-output, or, both.

A service proxy selection may include the selection of a proxy (from candidate proxies for each step) that best fits a criterion. Service selection can be based, for example, on suitability (for example, reading more about each candidate service) or quality of service (QoS) parameters (for example, availability, reputation, etc.), or both. Additionally, in one or more embodiments of the present invention, one can iteratively perform a service proxy look-up and a service proxy selection until a developer is satisfied.

Yet another element of a service composition may include a service proxy import (that is, code generation), wherein the heterogeneity of underlying protocols (for example, Parlay-X, SIP, and CORBA) is hidden from a developer and a "deployable" code (for example, a BPEL specification, a Java program exposed as a Web-service, etc) is outputted.

Incorporating appropriate application logic may include service customization, wherein one can customize a service for different devices, platforms and access modalities (for example, both legacy (SMS, Voice) as well as next-generation (Web, VoIP.

As described herein, one or more embodiments of the invention include community input. At each phase, developer inputs (implicitly or explicitly) are obtained to enrich that phase. A look-up includes taking inputs for refining the search tags for services considered by the developer. A selection includes taking inputs regarding QoS parameters, Wiki-blog, etc. for each service. Also, a binding includes publishing snippets for various services and/or protocols, wherein these items can be reused. Community input can also include, for example, providing code for enabling an application to listen at an SMS port and customizing a snippet to tender an image (for example, on a hand-set).

For each step of the service, the individual can obtain offerings from the service registry. A service creation environment (SCE) provides an easy-to-use search interface. To make the services readily available, the SCE offers snippets and/or sample code fragments of the selected services. The individual may not be a telecom expert, and consequently the SCE hides the heterogeneity of protocols from the individual. Additionally, some of the steps in this creation of services may require application logic. An SCE facilitates the easy generation of the logic by providing visual programming interfaces. An SCE additionally helps the individual in exposing the created service through multiple modalities.

As noted above, one or more embodiments of the present invention include a proxy model. A proxy model, as described herein, can encapsulate service invocation in a well-defined object (for example, SMS, location), and hide heterogeneity of different telecom protocols (for example, SIP, Parlay-X etc.). Also, in one or more embodiments of the invention, techniques supported by proxy are based on Parlay-X standard for telecom, with only implementation changing across various providers.

One or more embodiments of the invention also include code generation. As described herein, a developer can design a service on a composition studio including component services and control flow (for example, sequencing, fork, join) An illustrative embodiment of the invention can provide a lookup and proxy selection for each service. Code generation may also include service design captured internally in an extensible markup language (XML) document.

Additionally, one or more embodiments of the present invention offer a "Code Generation View" to automatically generate a skeleton code for the service from an XML document. This can include, for example, importing proxies selected for different services (for example, a skeleton code can be generated for BPEL, Java, Javascript inside hypertext markup language (HTML), etc.), organizing utility snippets (for example, parsing output) for each proxy, and managing exception handling for each proxy.

As illustrated herein, one or mole embodiments of the invention include techniques for a staged creation of telecom services interacting with a community-driven repository. The stages may include, for example, specifying the steps needed in the creation, looking up matching components in a telecom services repository (for example, core telecom functionality such as, for example, SMS, call management, etc., as well as third party services, such as Google Maps, Yellow Pages, etc.), selecting the appropriate service to be used for various steps, and refining the selected service and/or snippets to suit the requirements of the developer.

The service can be customized depending on the access modality for the service (for example, SMS, voice, Web) as well as the characteristics of the end-user device. As described herein, telecom service developers interact with the repository through lookup, blog and publish steps. Further, to incorporate the Web 2.0 principles of service development, community inputs are obtained for refinement of tags, reuse of community-made snippets with rating, and ranking of services and snippets based on other-user blogs, comments and rating.

The repository can, for example, capture code snippets to access several classes of telecom services, third party services, as well as basic reusable snippets, which are often used during application development. Telecom service-specific snippets are exposed using a telecom palette. Examples of such service codes are codes for access to SMS gateway, presence server, and VoIP based call control. Examples of third party services are music, gaming, and Google maps. Telecom snippets as well as service-specific codes can significantly reduce the learning curve for application developers.

A repository may also include, for example, a metadata manager, a blog manager, an analytics manager and a publish manager. A metadata manager maintains metadata for proxies, wherein metadata is defined while publishing the proxy and complemented by addition from other users. A blog manager includes enabling a user to blog for a proxy and to see blog entries of other users. An analytics manager includes rating and ranking proxies based on one or more items of community input (for example, tagging, usages, user blogs, etc.) provided by one or more other users. An analytics manager is also capable of refining look-up criteria based on usage patterns. A publish manager includes publishing capability to import one or more community-made snippets and proxies into the repository.

One or more embodiments of the invention enable multiple different categories of application developers to contribute towards creation and composition of new services in a unified ecosystem. An exemplary eco-system is described herein.

One or more embodiments of the present invention include encapsulating service, protocol and language heterogeneity by accessing telecom elements through a generic proxy model. Also, a deployable code (for example, a BPEL specification, a Java program exposed as a Web-service, etc.) can be output. Also, enterprise logic can be separated from telecom functionality.

Techniques described herein can be, for example, supported by proxy based on Parlay-X standard for telecom, wherein implementation changes can occur across various providers. Proxies can be exposed in an application development environment through a telecom palette.

Telecom operators spend a significant amount of time provisioning a new service and connecting it to their billing system. A well encapsulated proxy for billing helps the operator in populating charging rules corresponding to a proxy user. Furthermore, a billing proxy can also be offered to a developer who can utilize it to charge users of her application. The charging models supported by the billing proxy are of various types (for example, charging could be based on a contract basis or a per usage basis).

As a part of proxies in the architecture described herein, there can be included a set of configurable attributes to suit a variety of applications. For example, in SMS the developer can restrict the size of message sent by a user. For location, the developer can configure the period of time for which the location information is cached within the proxy. Similarly, default handlers are defined for exceptions thrown by different interfaces. For instance, on encountering a NetworkBusyException, the default rule can be to wait for a certain amount of time before retrying. These attributes can be utilized and configured by the proxy user at any stage of the service development process to suit her requirements.

FIG. 1 is a diagram illustrating an exemplary telecom application template, according to an embodiment of the present invention. As described above, and by way of illustration herein, FIG. 1 includes elements start 102, receive SMS 104, application (App) logic 106, location 108, third-party service 110, application (App) logic 112, user interface (UI) construct 114, send SMS 116 and end 118. Additionally, FIG. 1 includes element of presence 120.

Figure 2:
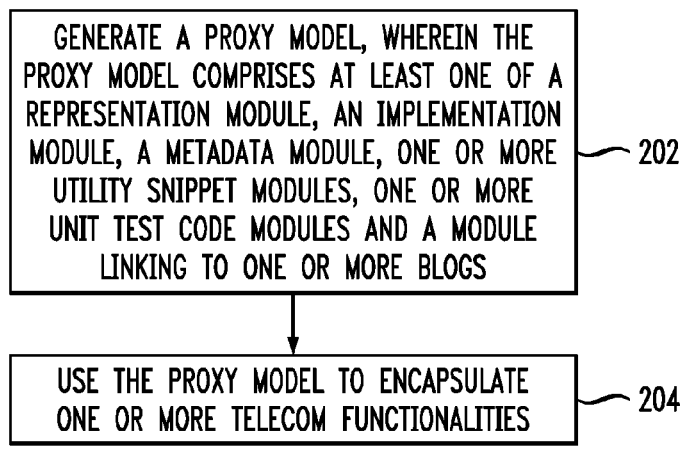
FIG. 2 is a flow diagram illustrating techniques fox using a proxy model to encapsulate one or more telecom functionalities, according to an embodiment of the present invention.

FIG. 2 is a flow diagram illustrating techniques for using a proxy model to encapsulate one or more telecom functionalities, according to an embodiment of the present invention. Step 202 includes generating a proxy model, wherein the proxy model comprises at least one of a representation module, an implementation module, a metadata module, one or more utility snippet modules, one or more unit test code modules and a module linking to one or more blogs. Step 204 includes using the proxy model to encapsulate one or more telecom functionalities.

The techniques depicted in FIG. 2 can also include the step of applying the proxy model to a non-telecom functionality such as, for example, a third-party service such as maps. Also, the proxy model can be enriched based on inputs from developers. The inputs can include, for example, a blog (including rating and ranking based on user blogs), social tags (including enabling users to add to the keywords and/or metadata associated with the proxies) and published utility snippets attached to a proxy functionality.

Figure 3:
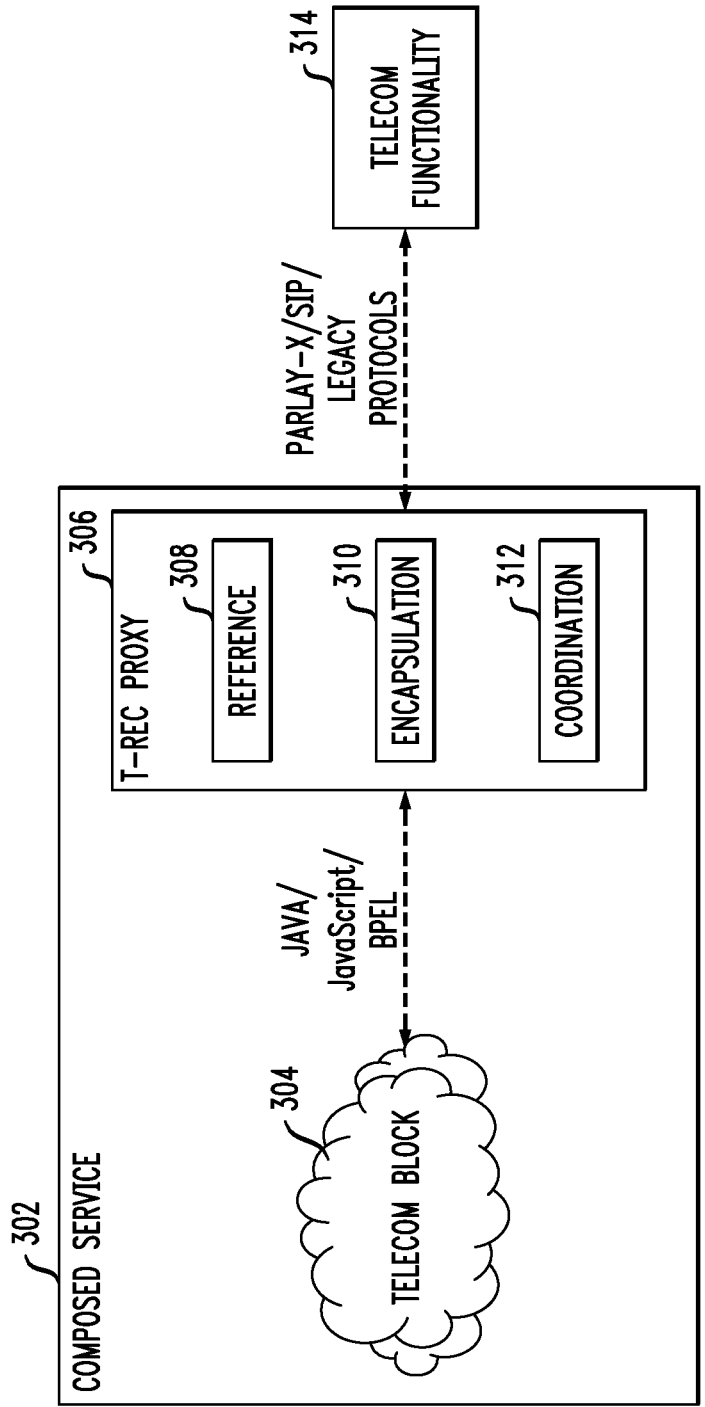
FIG. 3 is a diagram illustrating an exemplary proxy model, according to an embodiment of the present invention.

FIG. 3 is a diagram illustrating an exemplary proxy model, according to an embodiment of the present invention. By way of illustration, FIG. 3 depicts the elements of a composed service 302, a telecom block 304, T-Rec proxy 306 (which includes the elements of reference 308, encapsulation 310 and coordination 312) and telecom functionality 314.

The rich, structured telecom service reference, encapsulation and enrichment (T-Rec) proxy model depicted in FIG. 3 includes proxy representation, implementation, configuration file, metadata, utility snippets, unit test code and link to blogs.

Implementation includes a module connecting to the telecom service using the underlying protocol, and is available in different formats. For example, the implementation can be packaged as a .jar file for Java, a .js file for JavaScript, or could be encapsulated by visual constructs, such as widgets, and used inside JSP/HTML pages. A configuration file includes proxies that come with a default setting and can be configured by developers. Examples of such configuration include, for example, assigning default values for some of the parameters in an API, specifying the access control list, etc. Such settings could also be functionality specific, for instance, restricting the size of SMS messages.

Metadata includes enabling easy look up, keywords and tags related to the functionality encapsulated by a proxy that are associated with it. New tags can be added to the proxies if required (for example, when a developer utilizes a proxy in a way that was not originally foreseen by its creator).

Utility snippets include proxies that are populated with multiple code snippets on top of the basic functionality. For example, a presence proxy may have a program fragment that parses the returned response (usually an XML document) for different attributes. These utilities can be suggested to developers (using the proxy) in an appropriate way. A unit test code includes proxies that contain codes that let different APIs supported in the proxy be tested in isolation. These are very helpful during testing and debugging.

Link to blogs includes linking each proxy to a blog entry where developers can log their experience of using the proxy. If multiple proxies are suggested during a look up, analyzing the blog entries can help the developers choose the most appropriate one for their task.

Intuitively, a T-Rec proxy acts as a wrapper for telecom functionality, including its underlying protocol. Using this wrapper, the proxy creator can provide various benefits (such as, for example, those detailed below) to application developers.

For example, APIs defined in a proxy can hide or encapsulate protocol specific details from the developer. For instance, interfaces in Parlay-X throw exceptions with error codes that require knowledge of Parlay-X for interpretation. In this case, an application developer using Parlay-X would need to know that the error code SVC0004 stands for invalid addresses in a message, etc. Using the proxy model, one can encapsulate these error codes with higher level exceptions, for instance, throwing InvalidAddressException whenever error code SVC0004 is returned. Moreover, using proxies, similar APIs can be exposed across different protocols. For example, various APIs in the location proxy can have similar signatures for Parlay-X and SIP based implementations.

Also, when telecom functionality gets used in an application, a telecom operator as well as the developer may want to manage and meter its usage. For instance, whenever the proxy corresponding to location information gets invoked within an application, the telecom operator can authenticate the developer and also charge some amount. In this case, proxies are configured to collect the relevant information, for instance developerId, from the developer and send to the operator. Similarly, the developer can configure the location proxy to cache the location information locally within itself, and avoid connecting to the operator's infrastructure at each invocation.

The proxy model also provides an easy mechanism to incorporate various to business contracts between the operator and the developer. For example, an implementation module in a proxy can be extended to make the proxy display advertisements on behalf of the operator whenever it is invoked. In this case, logic can be such that the proxy picks what to advertise on a real-time basis.

Additionally, for example, a proxy creator can provide the benefits of collaboration and reuse. In a Web 2.0 world, information and services are in a state of perpetual beta, continuously undergoing refinement. Using the proxy model, developers can contribute towards enriching telecom functionality. For instance, a user of the location proxy in an application can publish a utility to parse the output of this service. This utility can be re-used by other developers while incorporating this proxy in their applications. Similarly, the proxies can be configured to provide updates to a developer about new entries on the blog, utilities published recently and bug fixes, etc. In the case of bug fixes, logic can be embedded in the proxy to automatically download the latest implementation modules.

Figure 4:
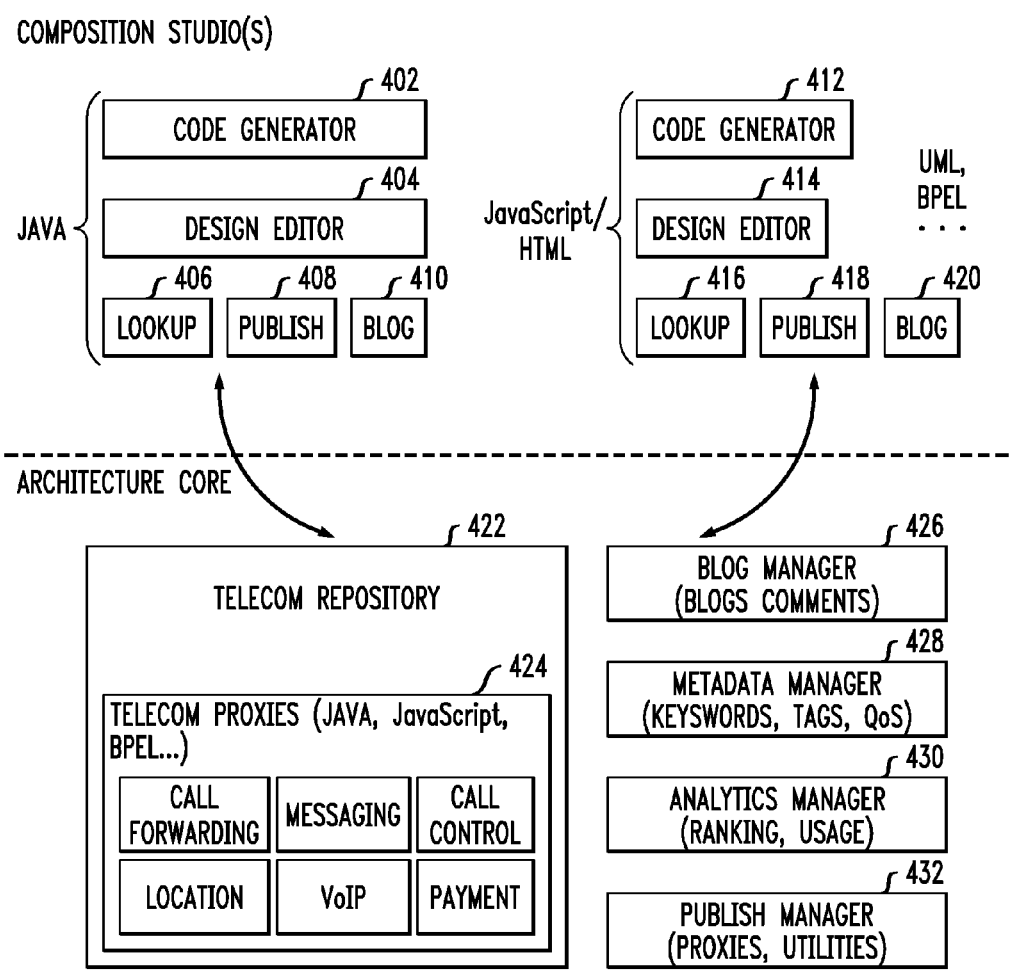
FIG. 4 is a diagram illustrating an exemplary architecture, according to an embodiment of the present invention.

The architecture described herein is a framework that utilizes the rich, structured T-Rec proxy model to enable seamless weaving of telecom functionality with application logic and other constructs required to develop a service. FIG. 4 is a diagram illustrating an exemplary architecture, according to an embodiment of the present invention.

By way of illustration, FIG. 4 depicts a composition studio that includes Java components of a code generator 402, a design editor 404, lookup 406, publish 408 and blog capabilities 410. A composition studio can also include JavaScript and/or HTML components of a code generator 412, a design editor 414, lookup 416, publish 418 and blog capabilities 420. Also, by way of example, multiple composition studios can co-exist, wherein a core service registry can be used by several different composition studios. As such, each composition studio can independently exist and utilize a service registry and each composition studio can be targeted towards a different type of developer.

FIG. 4 also depicts an architecture core which includes a telecom repository 422 with telecom proxies 424 including, for example, call forwarding, messaging, call control, location, VoIP, payment, etc. An architecture core can also include a blog manager 426, a metadata manager 428, an analytics manager 430 and a publish manager 432. As FIG. 4 illustrates, an illustrative embodiment of the invention has two main architectural components, architecture core and composition studio(s).

The architecture core forms the backbone architecture that exposes telecom functionality to developers through simple, intuitive interfaces for looking-up and selecting while allowing for developer participation and feedback through publishing and blogging. Telecom repository 422 includes proxies for different functionalities exposed by the telecom operator. These proxies are available in various implementation styles, for example, Java proxies to be used inside Java applications, JavaScript proxies to run on a Web browser, etc. As described herein, each proxy hides the underlying protocol (Parlay-X, SIP, etc.) and offers a rich set of APIs to facilitate integration with the application being developed.

Metadata manager 428 helps the telecom repository 422 organize and maintain relevant metadata (keywords and tags, textual description, etc.) associated with a proxy and the APIs it offers. This information can be used to suggest proxies on a look-up. Blog manager 426 organizes and stores free-form textual comments associated with a proxy and its APIs. These inputs are presented to a developer while browsing and selecting proxies from the telecom repository 422.

Analytics manager 430 maintains qualitative information about proxies, including a rating and ranking of each proxy. This manager can also contain tools to analyze blogs by different developers, collect usage statistics, etc. and make such information available to application developers. Publish manager 432 defines the interface to publish new proxies as well as new artifacts associated with an existing proxy. Published items can become available to other developers.

Developers wishing to use telecom proxies exposed by one or more embodiments of the invention can integrate their development environments (or composition studios) with the architecture core. These studios range from programming platforms (for example, an Eclipse environment) to model driven tools (such as those containing UML editors for service design and representation) to workflow editors allowing services to be composed in a language like BPEL. For integration with the architecture core, a studio preferably includes extensions along three dimensions. Firstly, its service design (or programming) editor can provide the ability to identify the telecom blocks from the non-telecom blocks. Secondly, it should offer lookup, publish and blogging interfaces for proxies provided by the architecture core. Thirdly, once proxies have been selected for different telecom blocks, the code generator module of the studio can traverse the structured format of each proxy to seamlessly integrate it with rest of the application code.

Additionally, as noted herein, a particular composition studio may make use of one or more different types of proxies. For example, while creating a JSP page, developers can incorporate both Java as well as JavaScript proxies.

In an illustrative embodiment of the present invention, architecture can be implemented to include various telecom proxies, a composition studio to develop services using these proxies, and generation of code in two different programming styles (that is, Java and BPEL). In such an embodiment, J-Rec proxies are built corresponding to SMS, location and presence functionality, as well as a proxy for third-party call control (3PCC). While SMS, location and 3PCC are designed on top of a Telecom Web Services Server (TWSS), the presence proxy is developed on SIP interfaces exposed by WebSphere Presence Server (WPS).

TWSS is an offering that enables telecom operators to provide developers with controlled, reliable access to network capabilities such as location, SMS and call control through standards-based Parlay-X web services WPS is an application that collects, manages, and distributes real-time presence information to applications and users based on the SIP protocol.

Proxies for these functionalities are created, for purposes of this illustrative embodiment, in three programming styles (that is, Java, WSDL and JavaScript). As noted herein, each proxy has an implementation module that connects to the service through the underlying protocol, a service representation object (including metadata about the proxy), a module to test the proxy in isolation and a set of attached utilities. All proxies are available through a repository implemented on top of, for example, a relational database management system. This repository provides various interfaces for integration with a composition studio (such as, for example, proxy lookup and import, publishing of new proxies and utilities, blogs indexed per proxy per API, etc.).

For SMS and location, BPEL proxies are created by using the WSDL interfaces defined by Parlay-X. These provide sufficient information for invoking the corresponding functionality from a BPEL workflow. Also, Java proxies are implemented by generating Java clients from these WSDL descriptions and wrapping inside the proxy structure. For the presence proxy based on SIP, the JAIN SIP standard can be used and the interfaces can be rendered in Java for publish, subscribe (with notification handling), etc. This illustrative implementation was also exposed as a web service, using which a WSDL interface was obtained for the BPEL proxy.

For Parlay-X based functionality (SMS and Location), JavaScript proxies can be created by including standard service oriented architecture protocol (SOAP) over HTTP calls from within a JavaScript code fragment. To create a Javascript proxy for SIP based services, one can implement a servlet (to be hosted on the operator's infrastructure) that talks to the presence server using SIP (over UDP) messages. In turn, the presence JavaScript proxy interacts with this servlet to fetch presence-related information while shielding the developer from specifics of SIP protocol.

FIG. 5 is a diagram illustrating an exemplary proxy 502 for the location functionality, according to an embodiment of the present invention.

Figure 6:
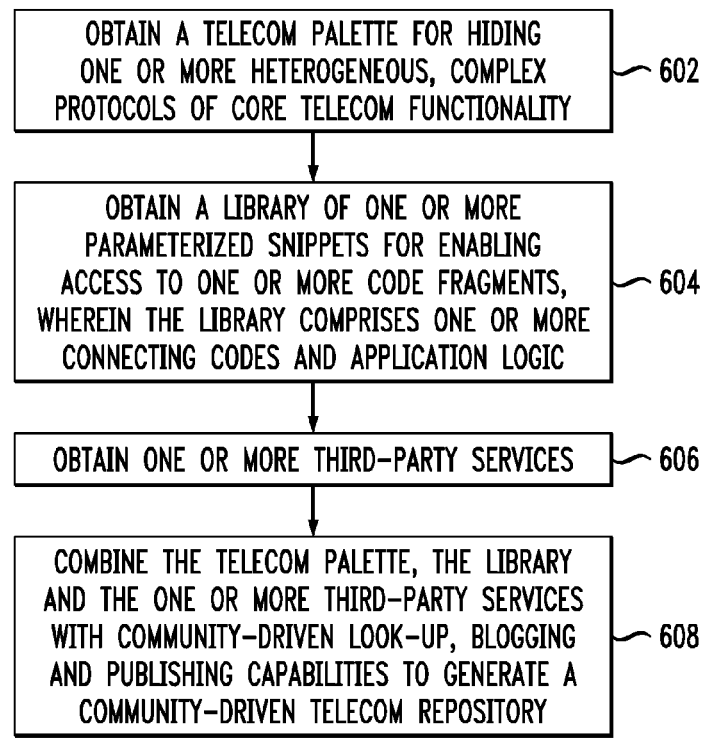
FIG. 6 is a flow diagram illustrating techniques for generating a community-driven telecom repository, according to an embodiment of the present invention.

FIG. 6 is a flow diagram illustrating techniques for generating a community-driven telecom repository, according to an embodiment of the present invention. Step 602 includes obtaining a telecom palette for hiding one or more heterogeneous, complex protocols of core telecom functionality.

Step 604 includes obtaining a library of one or more parameterized snippets for enabling access to one or more code fragments, wherein the library comprises one or more connecting codes and application logic. Step 606 includes obtaining one or more third-party services.

Step 608 includes combining the telecom palette, the library and the one or more third-party services with community-driven look-up, blogging and publishing capabilities to generate a community-driven telecom repository. The look-up capabilities may include, for example, refining one or more look-up criteria (for example, a keyword search). Blogging capabilities can include, for example, rating and ranking one or more web-logs (blogs) based on one or more blogs of one or more additional users. Publishing capabilities can include, for example, importing one or more community-made snippets into the library.

The techniques depicted in FIG. 6 may also include the additional step of linking one or more composition studios to the telecom repository. The studios can belong to different programming styles. One composition studio can make use of different proxies (for example, a JavaServer pages (JSP) editor using both Java and JavaScript proxies). Also, code generation can be in different styles (for example, Java, BPEL, etc.). Further, one or more composition studios can work on top of a repository and allow composition of the applications that use core telecom functions while hiding the complexity of different telecom protocols.

Figure 7:
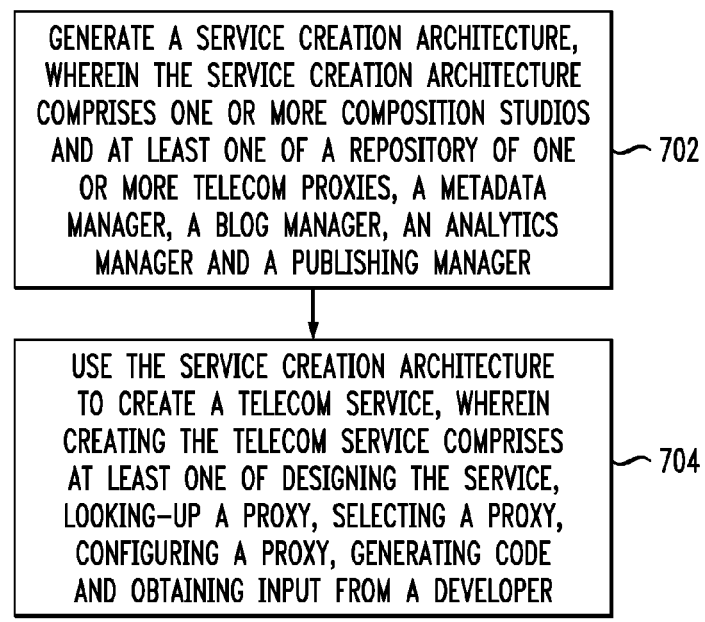
FIG. 7 is a flow diagram illustrating techniques for creating a telecom service, according to an embodiment of the present invention.

FIG. 7 is a flow diagram illustrating techniques for creating a telecom service, according to an embodiment of the present invention. Step 702 includes generating a service creation architecture, wherein the service creation architecture comprises one or more composition studios and at least one of a repository of one or more telecom proxies, a metadata manager, a blog manager, an analytics manager and a publishing manager. The composition studios can be linked to a telecom repository, and the studios can belong to different programming styles. Additionally, the techniques depicted in FIG. 7 can include, as an example, only one composition studio, wherein the one composition studio makes use of two or more styles of proxies (for example, a JSP editor using both Java and JavaScript proxies).

Step 704 includes using the service creation architecture to create a telecom service, wherein creating the telecom service comprises at least one of designing the service, looking-up a proxy, selecting a proxy, configuring a proxy, generating code and obtaining input from a developer. Generating code can include generating code in different styles (such as, for example, Java, BPEL, etc.).

Figure 8:
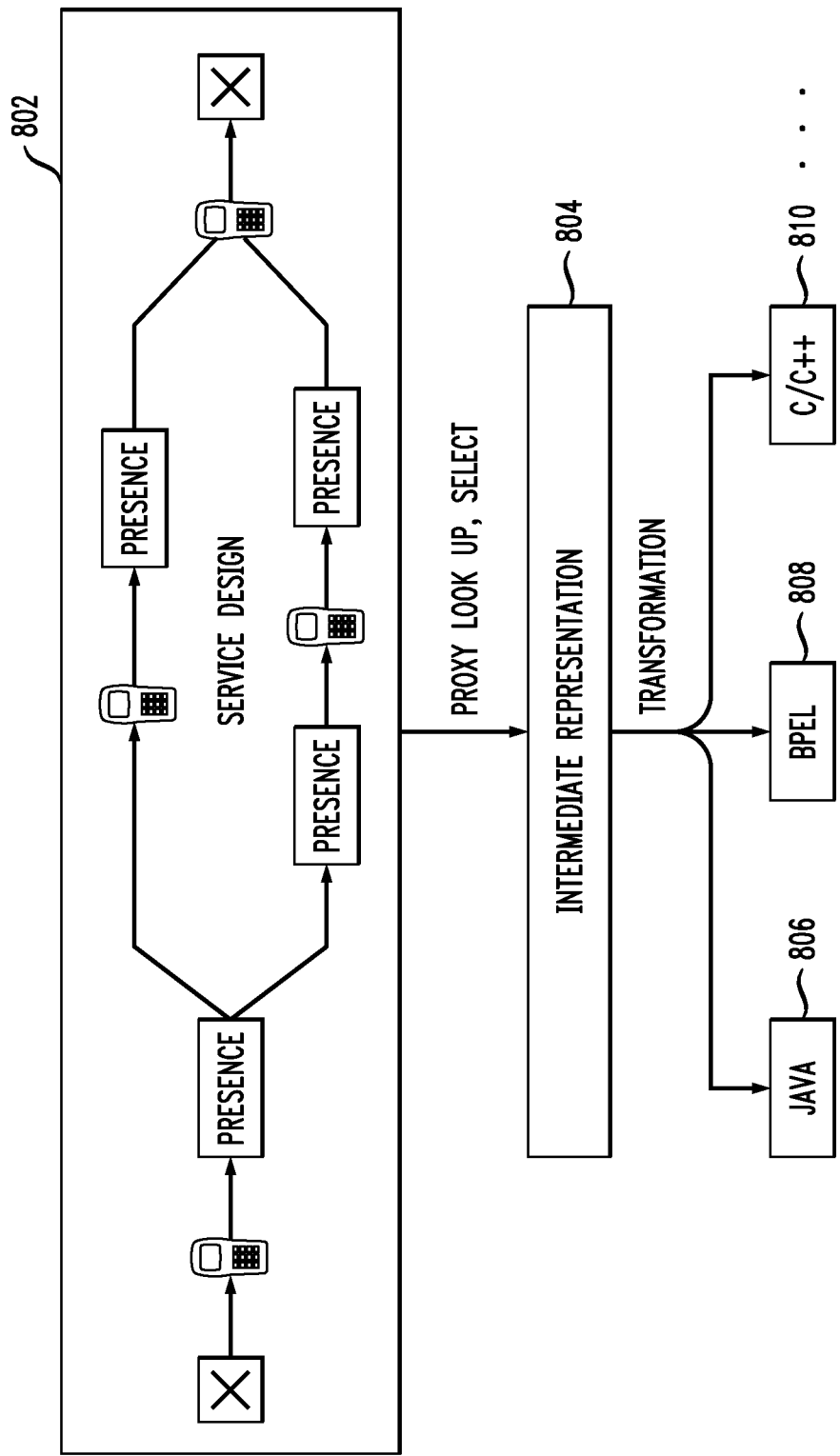
FIG. 8 is a diagram illustrating code generation, according to an embodiment of the present invention.

FIG. 8 is a diagram illustrating code generation, according to an embodiment of the present invention. By way of illustration, FIG. 8 depicts elements of service design 802, intermediate representation 804, Java 806, BPEL 808 and C/C++ 1210.

From a developer's point of view, once a service has been designed and relevant proxies have been selected for the telecom blocks, the developer expects the composition environment to generate a skeleton code that not only captures the service flow, but also integrates the code for the selected proxies. Further, this code should provide the extension points to include application logic and other constructs for the non-telecom blocks. This process of code generation can be divided, for example, into three steps (as described below).

For instance, service design can be captured in a structured document (referred to herein as processDoc). Further, for each telecom block, processDoc stores information about the proxy that was selected, and the API that was chosen under this proxy. It should be noted that the structure of processDoc and the information it stores is dependent on the programming style of the application. More specifically, it should be able to represent each programming construct of that style.

Also, a process skeleton can be generated. This step takes processDoc and transforms it to a concrete, fully-compiled code. For this purpose, a code generator parses processDoc and converts each element into the corresponding programming construct. While parsing this document, it creates place holders for the non-telecom blocks and adds comments to aid the developer when she examines the generated code. For the telecom blocks, it populates the proxy code.

In populating a telecom application with proxies corresponding to telecom services, the code generator imports the relevant implementations of the proxies from the telecom repository and generates the code necessary to invoke the selected API in the proxy. The code produced depends on the programming language. For example, while for Java, it creates a class with an invoke method that internally calls the proxy API, for BPEL it generates an invoke statement. Further, a code generator also analyses the method signature of each API to understand the exceptions being thrown and organizes appropriate exception-handling blocks around it. Also, unit test codes available with each proxy are made a part of the code generated.

For Java code generation purposes, the underlying implementation jars are imported from the repository, the corresponding import statements are added in the Java class, statements are added to instantiate the underlying proxy object, and the output of API chosen is captured by the developer. Further, one can parse the API invoked to import the data-types corresponding to input and output variables, and also to add try-catch blocks for handling the exceptions that can be possibly thrown. In general, the code produced is well-formatted and documented to smooth the task of ordinary Java programmers.

In the case of BPEL, it can be assumed that the telecom blocks to be realized by Web services and BPEL becomes the glue to bind the Web services into a cohesive enterprise solution. From the service design in processDoc, a WSDL description is generated that provides the name and interface fox the composite service and describes the port types and partner link types for stitching together the different blocks (components) in this service. Also, a BPEL structure is generated that captures the invocation of different components in the manner as described by the processDoc (that is, the control-flow of the service).

Further, the telecom blocks can be populated using specific details from the corresponding WSDL descriptions. For example, variables can be introduced that capture the input and output of each of these blocks. Similarly, the schemas containing definitions of the various used data-types can be automatically imported. For the non-telecom blocks, the developer has the option of either wrapping them as web services or utilize extensions to BPEL supporting inline Java code. Also, similar to the case of code generation in Java, the developer may edit the template BPEL workflow (for data-flow, etc.) before it is actually deployed.

Figure 9:
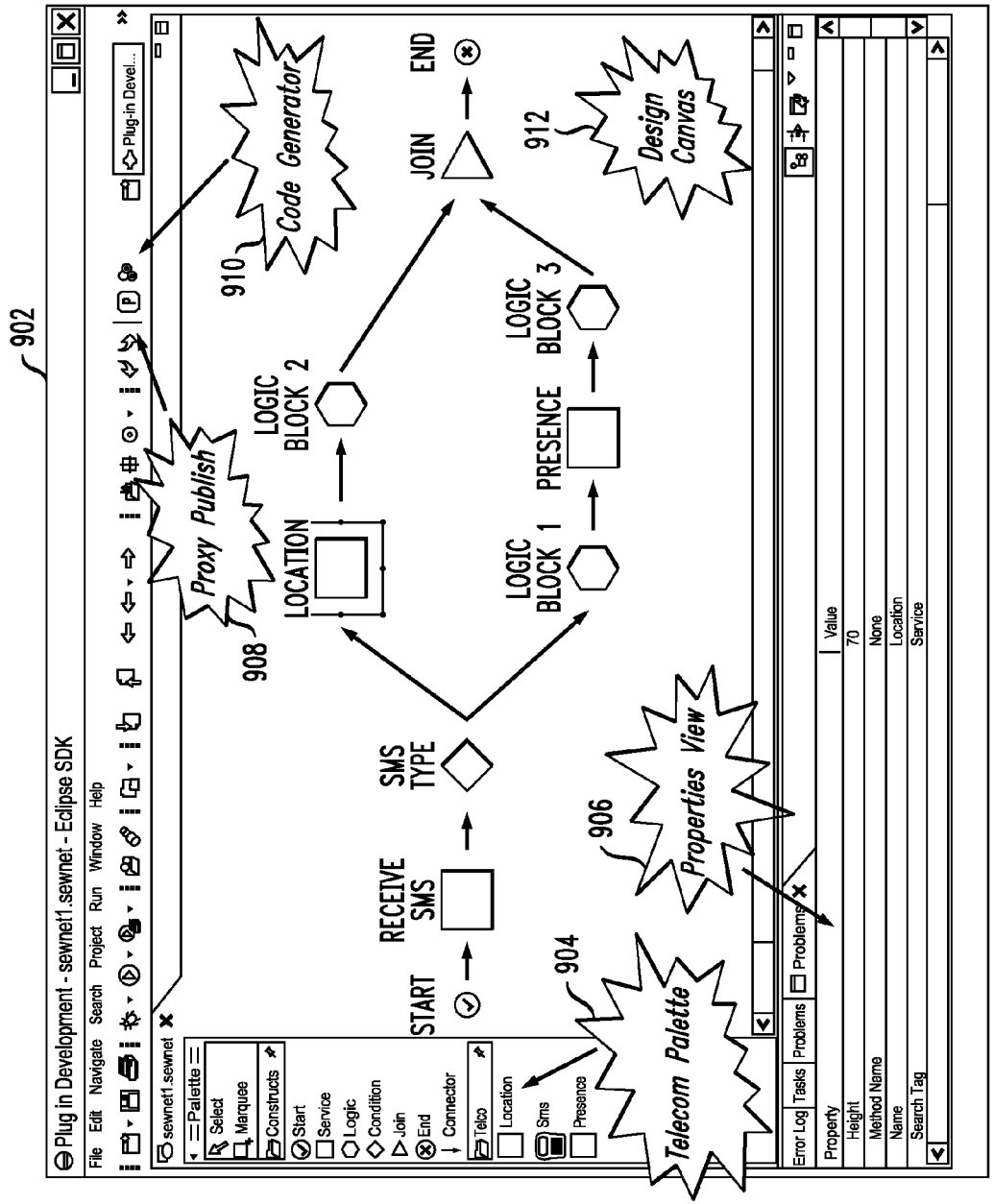
FIG. 9 is a diagram illustrating a snapshot of an exemplary composition studio, according to an embodiment of the present invention.

FIG. 9 is a diagram illustrating a snapshot of an exemplary composition studio 902, according to an embodiment of the present invention. By way of illustrating, FIG. 9 depicts a telecom palette 904, a properties view 906, a proxy publish 908, a code generator 910 and a design canvas 912.

FIG. 9 depicts a snapshot of a prototype composition studio for an illustrative embodiment of the invention along with an annotation of its different components. The constructs palette offers constructs to help build services, for example, those for specifying start and end blocks, differentiating a telecom block from application logic block, a condition statement, a join, etc. Also, a telecom palette 904 exposes proxies for accessing functionalities of the telecom network, and currently supports SMS, location and presence. The design canvas 912 lets the developers design their services through simple drag-and-drop of various constructs and telecom functionality. The properties view 906 displays attributes attached to different components of a service design. Once the service has been completely designed and the proxies chosen, developer can generate code by invoking the code generator 910. As an example, code can be generated in Java and BPEL.

FIG. 10 is a diagram illustrating proxy look-up and publishing interfaces, according to an embodiment of the present invention. By way of illustration, FIG. 10 depicts screen image 1002 and screen image 1004.

A composition studio provides service developers the ability to look-up existing proxies as well as the ability to publish new ones. The proxy look-up 1002 and publish 1004 interfaces are shown in FIG. 10. The look-up is enabled by the architecture's metadata manager and can be invoked using simple keywords. The results display a brief description of the suggested proxies following which the developer can ask for more details for the ones that match her requirements. Developers can also check blogs to benefit from other users' experience.

The publish interface provides an easy mechanism for developers (operators in the case of telecom functionality) to package their services as a proxy, and publish the same in the repository. These proxies can be looked up and reused by others, thereby fostering a collaborative environment.

Also, FIG. 11 is a diagram illustrating mash-up code fragment, according to an embodiment of the present invention. By way of illustration, FIG. 11 depicts screen image 1102. One or more embodiments of the invention can also be used to compose mash-ups involving telecom functionality and third-party services. An application that can be of help in, for example, transport service command center is a fleet dashboard that displays a map of service area with location and status information (like availability) of all vehicles in the fleet.

After the proxy selection, the developer can select appropriate functionalities of "getLocation" and stitch it with the Google map widget. During this selection of proxy function, appropriate implementations are imported, and code is added to the application to invoke selected telecom functions. FIG. 11 depicts the fragment of generated JSP code for the dashboard application.

Figure 12:
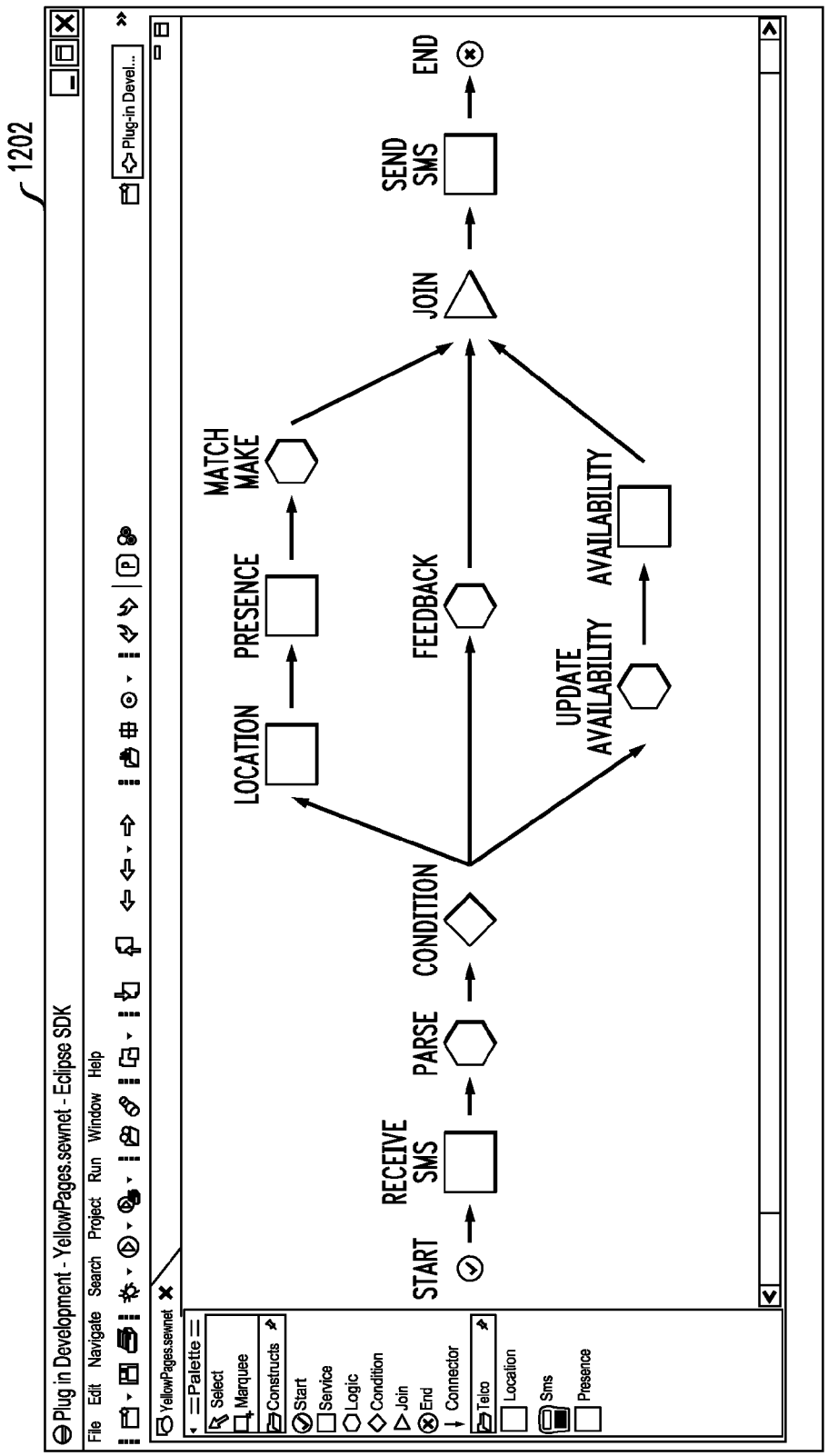
FIG. 12 is a diagram illustrating the design of a yellow pages service on the telecom infrastructure, according to an embodiment of the present invention.

FIG. 12 is a diagram illustrating the design of a yellow pages service on the telecom infrastructure, according to an embodiment of the present invention. By way of illustration, FIG. 12 depicts screen image 1202. Telecom operators, with their defined presence and location frameworks, can enable a dynamic, real-time Yellow-Pages service. In essence, this service would provide matches in response to a customer request seeking nearby, available vendors (such as tourist looking for a cab) by using a telecom network to determine the availability and location of the subscribed vendors.

FIG. 12 illustrates the design of this service on the architecture's composition studio. The service receives request messages via the "receive SMS" functionality, and proceeds to parse the content of these messages. The incoming requests can be categorized, for example, into three types. One type may correspond to a customer's request for a nearby, available vendor. For this, the service determines the current location and presence information of the subscribed vendors and formulates its response based on its internal match-making logic. A second type of request is a feedback from a customer, and an exemplary third type is from a vendor asking to update her availability status.

Also, "send SMS" is used to return the response to the requestor. Once the service has been designed, the developer proceeds to look up appropriate proxies for each of the telecom blocks. More specifically, proxies can be selected for SMS, location and presence functionalities.

Figures 13, 14:
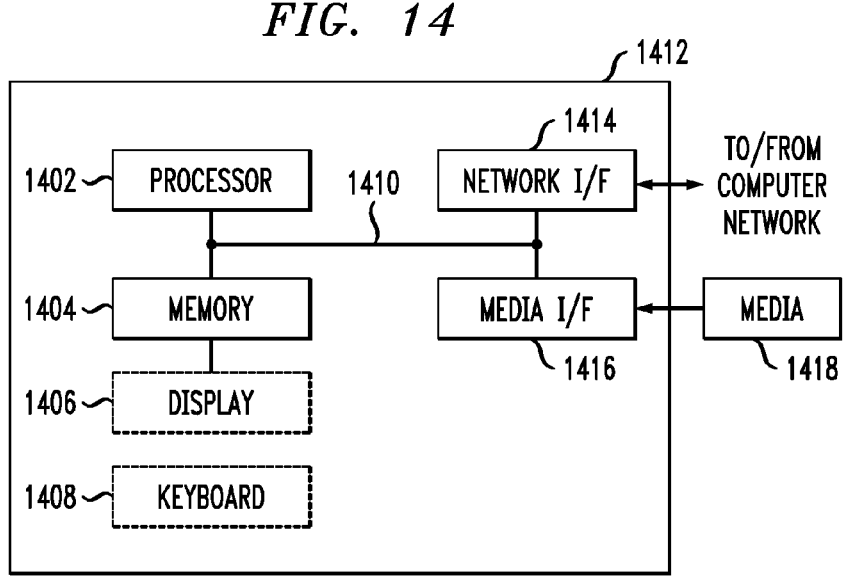
FIG. 13 is a diagram illustrating code for yellow pages services, according to an embodiment of the present invention.
FIG. 14 is a system diagram of an exemplary computer system on which at least one embodiment of the present invention can be implemented

FIG. 13 is a diagram illustrating code for yellow pages services, according to an embodiment of the present invention. By way of illustration, FIG. 13 depicts screen image 1302. From the service design, code can be generated either in Java or as a composite BPEL. FIG. 13 depicts a snap-shot screen image 1302 of the code generated in Java for a designed Yellow-Pages service. As the code structure in the left panel of FIG. 13 shows, a class is created for each of the telecom and non-telecom blocks. While the classes for SMS, availability and location are populated with the code to invoke the underlying proxy, classes for parse, matchmake, feedback and UpdateAvailability correspond to the application blocks, and act as place-holders for the service developer to incorporate her application specific logic.

YellowPages.java is the main class that coordinates the control flow of the service. This class has the code to call each proxy and application logic block using the invoke keyword. This class also contains the transformation of constructs corresponding to switch, fork, join, etc. used by the developer in designing the service. The code structure also includes the telecom constructs library and unit test codes for each of the telecom proxies.

The right section of FIG. 13 depicts the code generated to handle invocation of the location proxy, including the block to instantiate the proxy object, import statements to define the used data-types and handler blocks for the exceptions thrown. In this example, calls have been incorporated to the billing service (for monetizing the usage of location proxy). As described herein, the code produced can be easily imported as a project and enhanced inside the Eclipse development environment.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of a system including a memory and at least one processor that is coupled to the memory and operative to perform exemplary method steps.

At present, it is believed that the preferred implementation will make substantial use of software running on a general-purpose computer or workstation. With reference to FIG. 14, such an implementation might employ, for example, a processor 1402, a memory 1404, and an input and/or output interlace formed, for example, by a display 1406 and a keyboard 1408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1402, memory 1404, and input and/or output interface such as display 1406 and keyboard 1408 can be interconnected, for example, via bus 1410 as part of a data processing unit 1412. Suitable interconnections, fox example via bus 1410, can also be provided to a network interface 1414, such as a network card, which can be provided to interface with a computer network, and to a media interface 1416, such as a diskette or CD-ROM drive, which can be provided to interface with media 1418

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like Furthermore, the invention can take the form of a computer program product accessible from a computer-usable or computer-readable medium (for example, media 1418) providing program code for use by or in connection with a computer or any instruction execution system. For the purposes of this description, a computer usable or computer readable medium can be any system for use by or in connection with the instruction execution system, apparatus, or device The medium can be an electronic, magnetic, optical, electromagnetic, infrared, or semiconductor system (or apparatus or device) or a propagation medium. Examples of a computer-readable medium include a semiconductor or solid-state memory (for example, memory 1404), magnetic tape, a removable computer diskette (for example, media 1418), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 1402 coupled directly or indirectly to memory elements 1404 through a system bus 1410. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 1408, displays 1406, pointing devices, and the like) can be coupled to the system either directly (such as via bus 1410) or through intervening I/O controllers (omitted for clarity).

Network adapters such as network interface 1414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, providing a gateway into telecom offerings (for example, to location, presence, etc.) while hiding protocol heterogeneity.

Although illustrative embodiments of the present invention have been described herein with reference to the accompanying drawings it is to be understood that the invention is not limited to those precise embodiments, and that various other changes and modifications may be made by one skilled in the art without departing from the scope or spirit of the invention.

What is claimed is:

1. A computer program product comprising a tangible non-transitory computer useable storage medium having computer useable program code for using a proxy model to encapsulate one or more telecommunications (telecom) functionalities, said computer program product including:
    computer useable program code for generating a proxy model, wherein the proxy model comprises a representation module, an implementation module, a metadata module, one or more utility snippet modules, one or more unit test code modules and a module linking to one or more blogs;
    computer useable program code for using the proxy model to encapsulate one or more telecom functionalities into a telecom service comprising:
        identifying a set of matching services from a repository of telecom proxies for each of multiple steps necessary for the telecom service, as specified by a developer, wherein said repository comprises community input;
        selecting a service from the set of matching services for each of the multiple steps necessary for the telecom service based on multiple quality of service parameters comprising at least availability and reputation;
        performing iterations of said identifying and said selecting until the developer provides express approval of the services selected for each of the multiple steps; and
        composing the telecom service by binding the services selected for each of the multiple steps;
    computer useable program code for customizing the telecom service based on: (i) a given one or more access modalities associated with the telecom service and selected from a collection of multiple access modalities supported by the telecom service comprising (a) a short message service modality, (b) a voice modality, (c) a web modality, and (d) a voice over internet protocol modality, (ii) a given platform associated with the telecom service, and (iii) one or more characteristics of a given end-user device on which the telecom service will be implemented;
    computer useable program code for outputting the telecom service based on the proxy model;
    computer useable program code for generating a rating for the proxy model based on multiple items of community input comprising at least (i) tagging activity associated with the proxy model carried out by community users, (ii) usage of the proxy model by community users, (iii) internet review content provided by community users; and
    computer useable program code for ranking the proxy model among multiple other proxy models based on the rating generated for the proxy model and a rating generated for each of the multiple other proxy models.

2. The computer program product of claim 1, further comprising computer useable program code for using the proxy model to hide invocation complexity for one or more telecom protocols.

3. The computer program product of claim 1, further comprising computer useable program code for using the proxy model to coordinate usage of one or more telecom functionalities.

4. The computer program product of claim 1, further comprising computer useable program code for generating the proxy model in one or more programming styles.

5. The computer program product of claim 1, further comprising computer useable program code for applying the proxy model to a non-telecom functionality.

6. A computer program product comprising a tangible non-transitory computer useable storage medium having computer useable program code for creating a telecom service, said computer program product including:
   computer useable program code for generating a service creation architecture, wherein the service creation architecture comprises one or more composition studios and a repository of one or more telecom proxies, a metadata manager, a blog manager, an analytics manager and a publishing manager;
   computer useable program code for using the service creation architecture to create a telecom service, wherein creating the telecom service comprises:
      identifying a set of matching services from the repository for each of multiple steps necessary for the telecom service, as specified by a developer, wherein said repository comprises community input;
      selecting a service from the set of matching services for each of the multiple steps necessary for the telecom service based on multiple quality of service parameters comprising at least availability and reputation;
      performing iterations of said identifying and said selecting until the developer provides express approval of the services selected for each of the multiple steps; and
      composing the telecom service by binding the services selected for each of the multiple steps;
   computer useable program code for customizing the telecom service based on: (i) a given one or more access modalities associated with the telecom service and selected from a collection of multiple access modalities supported by the telecom service comprising (a) a short message service modality, (b) a voice modality, (c) a web modality, and (d) a voice over internet protocol modality, (ii) a given platform associated with the telecom service, and (iii) one or more characteristics of a given end-user device on which the telecom service will be implemented;
   computer useable program code for packaging the telecom service as a proxy;
   computer useable program code for publishing the proxy into the repository;
   computer useable program code for generating a rating for the proxy based on multiple items of community input comprising at least (i) tagging activity associated with the proxy carried out by community users, usage of the proxy by community users, internet review content provided by community users; and
   computer useable program code for ranking the proxy among multiple other proxies based on the rating generated for the proxy and a rating generated for each of the multiple other proxies.

7. A system for using a proxy model to encapsulate one or more telecommunications (telecom) functionalities, comprising:
   a memory; and
   at least one processor coupled to said memory and wherein the at least one processor is programmed with instructions to:
      generate a proxy model, wherein the proxy model comprises a representation module, an implementation module, a metadata module, one or more utility snippet modules, one or more unit test code modules and a module linking to one or more blogs;
      use the proxy model to encapsulate one or more telecom functionalities into a telecom service comprising:
         identifying a set of matching services from a repository of telecom proxies for each of multiple steps necessary for the telecom service, as specified by a developer, wherein said repository comprises community input;
         selecting a service from the set of matching services for each of the multiple steps necessary for the telecom service based on multiple quality of service parameters comprising at least availability and reputation;
         performing iterations of said identifying and said selecting until the developer provides express approval of the services selected for each of the multiple steps; and
         composing the telecom service by binding the services selected for each of the multiple steps;
      customize the telecom service based on: (i) a given one or more access modalities associated with the telecom service and selected from a collection of multiple access modalities supported by the telecom service comprising (a) a short message service modality, (b) a voice modality, (c) a web modality, and (d) a voice over internet protocol modality, (ii) a given platform associated with the telecom service, and (iii) one or more characteristics of a given end-user device on which the telecom service will be implemented;
      output the telecom service based on the proxy model;
      generate a rating for the proxy model based on multiple items of community input comprising at least (i) tagging activity associated with the proxy model carried out by community users, usage of the proxy model by community users, internet review content provided by community users; and
      rank the proxy model among multiple other proxy models based on the rating generated for the proxy model and a rating generated for each of the multiple other proxy models.

8. The system of claim 7, wherein the at least one processor coupled to said memory is further operative to use the proxy model to hide invocation complexity for one or more telecom protocols.

9. The system of claim 7, wherein the at least one processor coupled to said memory is further operative to use the proxy model to coordinate usage of one or more telecom functionalities.

10. The system of claim 7, wherein the at least one processor coupled to said memory is further operative to generate the proxy model in one or more programming styles.

11. The system of claim 7, wherein the at least one processor coupled to said memory is further operative to apply the proxy model to a non-telecom functionality.

* * * * *